Oct. 28, 1941.  T. L. GATKE  2,260,567

MOLDED COMPOSITION SLIPPER BEARING

Filed May 25, 1940

INVENTOR.
Thomas L. Gatke,
BY Cromwell, Greist + Warden
Attys.

Patented Oct. 28, 1941

2,260,567

UNITED STATES PATENT OFFICE 2,260,567

MOLDED COMPOSITION SLIPPER BEARING

Thomas L. Gatke, Oak Park, Ill.

Application May 25, 1940, Serial No. 337,140

7 Claims. (Cl. 64—7)

The object of the present invention is to provide an improved slipper bearing for universal couplings.

The slipper bearing of the invention is especially applicable to heavy duty universal couplings, such as those used in rolling mill drives, but it may also be used advantageously in smaller sized universal couplings.

It has been the practice heretofore to make such slipper bearings out of bronze or other metal, but considerable difficulty has been experienced with the same, as they wear out and break down rapidly under the extremely high pressures and pounding to which they are subjected, requiring frequent and expensive replacement.

This new slipper bearing is a molded non-metallic composition member. It is preferably made in either three or four separable parts, namely, two opposed cylindrical segments and either one or two interposed center block portions. It is also preferably built up from specially shaped and arranged fabric layers which are impregnated with, and molded under pressure in, a synthetic resinous compound or other compound of any type suitable for bearing purposes. This slipper bearing has ample strength, will give considerably longer service than the usual metallic bearing, is much lighter (only about one-fifth the weight of bronze) with consequent advantages, particularly in connection with off-center loads, will not wear the companion surfaces of the coupling should lubrication fail, is quiet in operation, cushions shocks, is non-scoring, and is much more economical to employ.

An important feature of the improved slipper bearing is the inclusion, at the junctions between the cylindrical segments and the ends of the center block, of metal hubs which are molded into the cylindrical segments and are socketed to provide recesses for the ends of the center block.

While the foregoing statements are indicative of the nature of the invention, other more specific objects and advantages will be apparent to those skilled in the art from a full understanding of the improved slipper bearing.

A preferred embodiment of the invention is presented herein, but it will of course be appreciated that the invention is capable of incorporation in other structurally modified forms coming equally within the scope of the appended claims.

Figure 1:
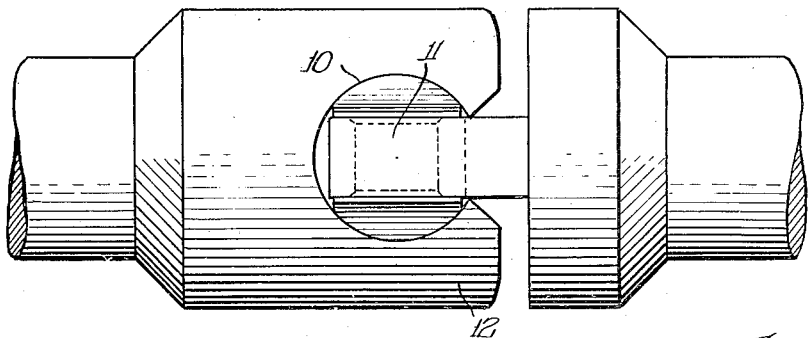
Fig. 1 is a side view of a universal joint equipped with a slipper bearing constructed in accordance with the invention.
Figure 2:
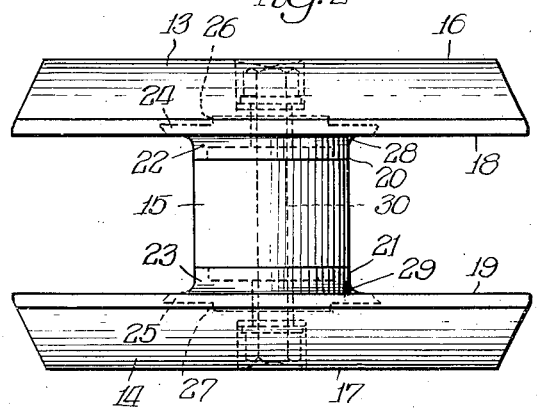
Fig. 2 is a side view of the slipper bearing, removed from the universal joint.
Figure 3:
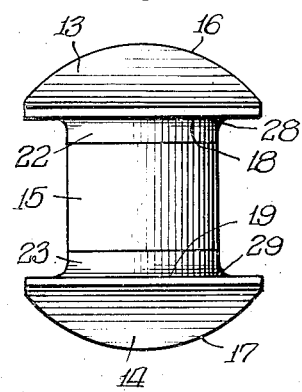
Fig. 3 is an end view of the slipper bearing.

The improved slipper bearing is shown in Fig. 1 at 10, in position between complementary male and female heads 11 and 12 of a universal coupling. As will be observed in Figs. 2 and 3, the slipper bearing includes primarily two cylindrical segments 13 and 14 and a center block 15. These three parts are all made of a non-metallic molded composition, such as synthetic resinous compound, or other compound of any type suitable for bearing purposes, and preferably contain laminated fabric layers which are impregnated with, and molded under pressure in, the non-metallic compound. The cylindrical segments 13 and 14 are arranged in spaced relation with their outer surfaces 16 and 17 substantially concentric and their inner surfaces 18 and 19 generally parallel. The center block 15 is positioned between the cylindrical segments 13 and 14, at the centers of the latter. This center block is shown as made in one piece, but it may be made in two portions, with their ends in abutment with each other.

Figure 4:
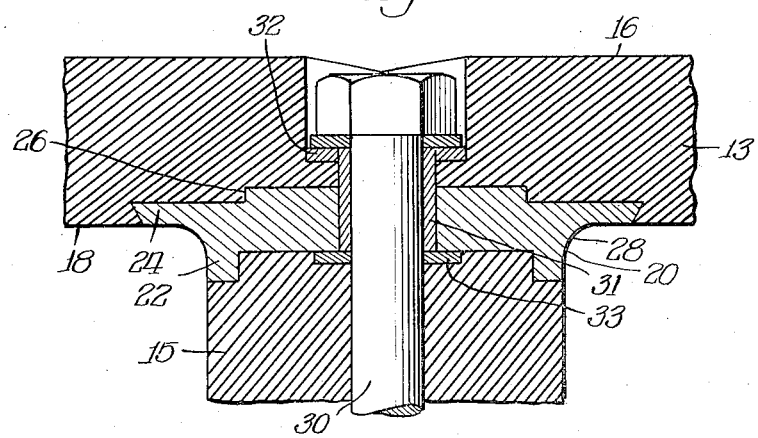
Fig. 4 is a fragmentary diametric section through the slipper bearing at the location of one of the metal hubs.

At the centers of the inner surfaces 18 and 19 of the cylindrical segments two small metal hubs 20 and 21 are provided. These hubs are molded into the segments and are provided with ring portions 22 and 23, preferably of the same diameter as the center block 15, which project from the inner surfaces 18 and 19 toward each other. The ends of the center block abut against the hubs 20 and 21 and are preferably reduced and socketed within the ring portions 22 and 23, as shown in Fig. 4. The hubs 20 and 21 are also provided with flanges 24 and 25 which are disposed flush with the inner surfaces 18 and 19 of the segments. The edges of these flanges are preferably beveled to dovetail within such surfaces. The center portions of the hubs are also preferably thickened to provide edges 26 and 27 to augment the edgewise engagement of the flanges 24 and 25 with the composition forming the segments. The outer surfaces of the ring portions 22 and 23 are also preferably filleted out at 28 and 29 into the planes of the inner surfaces 18 and 19 of the segments.

The cylindrical segments 13 and 14, with their integral molded collars 20 and 21, and the center block 15 may be secured together in assembled relation by means of a bolt 30 passing through apertures in such members. Metal bushings 31 may be positioned about the ends of the bolt where they pass through the segments and hubs, and washers 32 and 33 may be disposed at the ends of the bushings.

I claim:

1. A slipper bearing for a universal coupling, comprising two non-metallic molded composition cylindrical segments which are arranged in spaced relation with their outer surfaces substantially concentric and their inner surfaces generally parallel, relatively small metal hubs which are molded into the segments at the centers of the inner surfaces of the latter and are provided with ring portions which project from said inner surfaces towards each other, and a non-metallic molded composition center block which is socketed at its ends in said ring portions.

2. A slipper bearing for a universal coupling, comprising two non-metallic molded composition cylindrical segments which are arranged in spaced relation with their outer surfaces substantially concentric and their inner surfaces generally parallel, relatively small metal hubs which are molded into segments at the centers of the inner surfaces of the latter and are provided with annular ring portions which project from said inner surfaces towards each other, and a non-metallic molded composition center block of substantially the same diameter as the outer perimeter of said ring portions, which center block is provided with reduced ends which are socketed within the inner periphery of said ring portions.

3. A slipper bearing for a universal coupling, comprising two non-metallic molded composition cylindrical segments which are arranged in spaced relation with their outer surfaces substantially concentric and their inner surfaces generally parallel, relatively small metal hubs which are molded into the segments at the centers of the inner surfaces of the latter and are provided with ring portions which project from said inner surfaces towards each other, and a non-metallic molded composition center block of substantially the same diameter as the outside diameter of said ring portions, which center block is provided with reduced ends which are socketed in said ring portions, the outer surfaces of said ring portions being filleted out into the planes of the inner surfaces of the segments.

4. A slipper bearing for a universal coupling, comprising two non-metallic molded composition cylindrical segments which are arranged in spaced relation with their outer surfaces substantially concentric and their inner surfaces generally parallel, relatively small metal hubs which are molded into the segments at the centers of the inner surfaces of the latter and are provided with ring portions which project from said inner surfaces towards each other, and a non-metallic molded composition center block which is socketed at its ends in said ring portions, said hubs being also provided with flanges which are disposed flush with the inner surfaces of the cylindrical segments.

5. A slipper bearing for a universal coupling, comprising two non-metallic molded composition cylindrical segments which are arranged in spaced relation with their outer surfaces substantially concentric and their inner surfaces generally parallel, relatively small metal hubs which are molded into the segments at the centers of the inner surfaces of the latter and are provided with ring portions which project from said inner surfaces towards each other, and a non-metallic molded composition center block which is socketed at its ends in said ring portions, said hubs being also provided with flanges which are disposed flush with the inner surfaces of the cylindrical segments and have their edges dovetailed within said surfaces.

6. A slipper bearing for a universal coupling, comprising two non-metallic molded composition cylindrical segments which are arranged in spaced relation with their outer surfaces substantially concentric and their inner surfaces generally parallel, relatively small metal hubs which are molded into the segments at the centers of the inner surfaces of the latter and are provided with ring portions which project from said inner surfaces towards each other, and a center block which is socketed at its ends in said ring portions.

7. A slipper bearing for a universal coupling, comprising two non-metallic molded composition cylindrical segments which are arranged in spaced relation with their outer surfaces substantially concentric and their inner surfaces generally parallel, a non-metallic molded composition center block member, and relatively small reinforcing metal hubs at either end of said block member joining the same to said segments.

THOMAS L. GATKE.